F. H. GLEASON.
MEANS FOR LUBRICATING STEERING KNUCKLES OF VEHICLES.
APPLICATION FILED JAN. 18, 1921.
1,388,945. Patented Aug. 30, 1921.
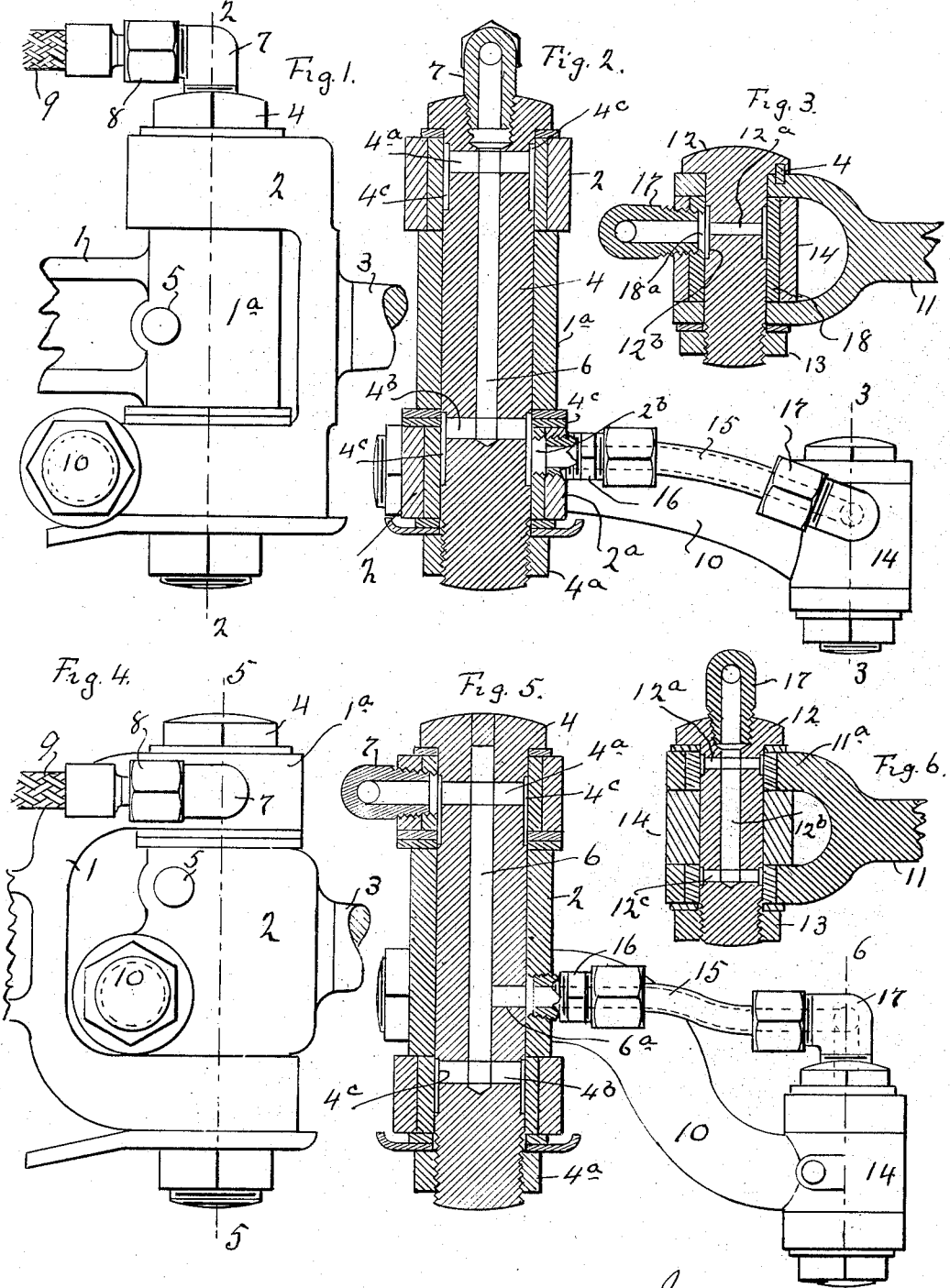

UNITED STATES PATENT OFFICE.

FREDERICK H. GLEASON, OF NEW YORK, N. Y.

MEANS FOR LUBRICATING STEERING-KNUCKLES OF VEHICLES.

1,388,945.     Specification of Letters Patent.     Patented Aug. 30, 1921.

Application filed January 18, 1921. Serial No. 438,064.

*To all whom it may concern:*

Be it known that I, FREDERICK H. GLEASON, a citizen of the United States, and resident of New York city, borough of Manhattan, in the county of New York and State of New York, have invented certain new and useful Improvements in Means for Lubricating Steering-Knuckles of Vehicles, of which the following is a specification.

The object of my invention is to provide means to lubricate the joints of knuckles of the steering wheels as well as the joints of the tie-rods between the knuckles of such wheels in automobiles or motor vehicles from a single supply of lubricant to each knuckle.

In accordance with my invention I provide the bolt of the steering knuckle with a bore to receive lubricant and passages from the bore to supply the bearings of the knuckle or the bolt, and a conduit to be supplied with lubricant from the first named bore and in communication with the bearing of the tie-rod that is connected with an arm of the knuckle.

My invention also comprises novel details of improvement that will be more fully hereinafter set forth and then pointed out in the claims.

Reference is to be had to the accompanying drawings forming part hereof, wherein—

Figure 1 is a side view of a portion of a steering knuckle of an automobile or motor vehicle embodying my invention; Fig. 2 is a section on line 2, 2 in Fig. 1; Fig. 3 is a section on line 3, 3 of Fig. 2; Fig. 4 is a side view of a different form of steering knuckle embodying my invention; Fig. 5 is a section on the line 5, 5 in Fig. 4, and Fig. 6 is a section on line 6, 6 in Fig. 5.

Similar numerals of reference indicate corresponding parts in the several views.

The numeral 1 indicates a portion of the front axle of an automobile or motor vehicle, and 2 indicates the steering knuckle pivotally connected with said axle and provided with the shaft or spindle 3 for the wheel bearing, which parts may be of usual or suitable construction. In the form shown in Fig. 1 the axle is provided with bearing 1ª receiving bolt 4, which bolt is secured to said bearing as by means of a pin 5, or in other desired manner, whereby the bolt is stationary and the forked or yoke-like portion 2ª of the steering knuckle receives the bearing 1ª and is journaled on bolt 4 to rotate relatively to the latter as sustained by the bearing 1ª. Bolt 4 is shown provided with a head at one end and with a nut 4ª at the other end on opposite sides of the yoke of the knuckle, in Figs. 1 and 2, and correspondingly arranged with respect to the yoke or fork of the axle, as indicated in Figs. 4 and 5. Bolt 4 is provided with a longitudinal bore 6 to which a fitting 7 is attached, as shown in Figs. 1 and 2, for a supply of lubricant from the fitting to said bore. Said fitting is shown in the form of an elbow connected by nut 8 to a flexible tube 9, which may be connected to any suitable supply source of lubricant. Bolt 4 is provided with transverse passages 4ª for the upper bearing and transverse passages 4ᵇ for the lower bearing, vertical grooves 4ᶜ being provided in the bolt at said bearings to receive lubricant from passages 4ª, 4ᵇ. The arm 10 that projects from the steering knuckle for connection with the tie-rod or drag-link 11 is provided with a bolt or pin 12 to connect said parts, which bolt or pin is shown provided with a head at one end and with a nut 13 at the other end in usual manner. In the form shown in Figs. 2 and 3 the bolt 12 is secured to tie-rod 11 by pin 14 so that the bolt rotates in the bearing at the end of arm 10, whereas in Figs. 5 and 6 the bolt 12 is free from the tie-rod and the latter rotates on bearing 14 relatively to said bolt.

An object of my invention is to convey lubricant from the bore of bolt 6 to the bearing of tie-rod 11 on arm 10. In the form shown in Figs. 1, 2, and 3, since the knuckle rotates relatively to the steering bolt 4, I provide a conduit or tube 15 that connects the jaw 2ª of knuckle 2 to the bearing 14 of arm 10 so that all of said parts will move together. I have shown the lower jaw 2ª provided with a port 2ᵇ communicating with a fitting 16 connected with tube 15, said tube being shown connected by fitting 17, shown in the form of an elbow, with bearing 14, at which said fitting is attached. Bushing 18 in bearing 14, is provided with a port 18ª communicating with a transverse bore 12ª in bolt 12, said bolt being shown provided with grooves 12ᵇ communicating with bore 12ª to supply both sides of the bolt with lubricant.

In the form shown in Figs. 4, 5, 6, where bolt 4 rotates with knuckle 2 and is secured thereto by pin 5 and tie-rod 11 rotates upon pin 12, the fitting 16 is attached to the knuckle 2 and communicates with a side bore 6ᵃ that communicates with bore 6 in bolt 4, the fitting 17 being attached to bolt 12 at the top, the tube 15 connecting fittings 16 and 17. Bolt 12 is shown provided with a longitudinal bore 12ᵇ communicating with fitting 17 and with transverse bores 12ᶜ communicating with bore 12ᵇ and leading to the exterior of the bolt to supply the bearings at the fork or yoke 11ᵃ of the tie-rod. Since, in the last named figures, bolt 4 rotates with respect to the fork or yoke of axle 1 the fitting 7 that is connected with flexible tubing 9 is attached to the upper jaw 1ᵃ of said yoke or fork and communicates with bore 4ᵃ of bolt 6, Fig. 5.

In accordance with my invention lubricant may be supplied through tube 9 to bolt 4 from any suitable source whether under pressure or by gravity, and such lubricant will not only lubricate bearings of the bolt, knuckle, and axle but will be supplied through tube or conduit 15 to the bearings of the tie-rod. Since the parts 15, 16 and 17 move as a unit with arm 10 it will be apparent that in all positions of the knuckles the tie-rod bearings connected therewith will receive lubricant from bolt 4, so that it is only necessary to supply said bolt with lubricant to lubricate the bearings for the knuckle and the bearings for the tie-rod. Similar construction may be provided on each side of the vehicle.

While I have not set forth any particular means to supply lubricant to the bearings through tube 9 the same may be supplied under pressure or by gravity by means set forth in my companion application filed herewith, wherein I have disclosed a lubricating system for an automobile chassis supplied with lubricant from the same pump that supplies the bearings of the motor of the vehicle under pressure.

Having now described my invention, what I claim is:

1. The combination of an axle, a steering knuckle, a bolt pivotally connecting the same, an arm extending from the knuckle, a tie-rod, a bolt pivotally connecting the tie-rod and arm, means to supply the first named bolt with lubricant, and a conduit communicating with the bearings of the first and second named bolts to convey lubricant from the first named to the second named bolt.

2. The combination of an axle, a steering knuckle, a bolt pivotally connecting the same, an arm extending from the knuckle, a tie-rod, a bolt pivotally connecting the tie-rod and arm, said bolt having a bore and passages to supply lubricant to the bearings thereof, and a conduit communicating with said bore and with the bearings of the bolt of the tie-rod.

3. The combination of an axle, a steering knuckle, a bolt pivotally connecting the same, an arm extending from the knuckle, a tie-rod, a bolt pivotally connecting the tie-rod and arm, a fitting connected to one of the first named parts, a fitting connected to one of the tie-rod parts, and a conduit connecting said fittings to supply lubricant from the first named bolt to the second named bolt.

4. The combination of an axle, a steering knuckle, a bolt pivotally connecting the same and provided with a bore communicating with its exterior, a supply fitting communicating with said bore, said knuckle having an arm, a tie-rod, a bolt pivotally connecting the arm and tie-rod, a fitting communicating with said bolt, and a conduit connecting said fittings.

5. The combination of an axle, a steering knuckle, a bolt pivotally connecting the same and provided with a bore communicating with its exterior, a supply fitting connected to the bolt and communicating with its bore, said knuckle having an arm, a tie-rod, a bolt pivotally connecting the arm and tie-rod, and a conduit communicating with the first and second named bolts.

6. The combination of an axle, a steering knuckle, a bolt pivotally connecting the same and provided with a bore communicating with its exterior, a supply fitting communicating with said bore, said knuckle having an arm, a tie-rod, a bolt pivotally connecting the arm and tie-rod, said arm having a fitting communicating with last named bolt, and a conduit connecting said fittings.

Signed at New York city, in the county of New York, and State of New York, this 14th day of January, A. D. 1921.

FREDERICK H. GLEASON.